No. 719,519. PATENTED FEB. 3, 1903.
H. H. SESSIONS, A. P. DENNIS & R. D. GALLAGHER, Jr.
RADIAL BUFFING AND DRAFT RIGGING FOR RAILWAY CARS.
APPLICATION FILED SEPT. 24, 1902.
NO MODEL. 6 SHEETS—SHEET 1.

No. 719,519. PATENTED FEB. 3, 1903.
H. H. SESSIONS, A. P. DENNIS & R. D. GALLAGHER, Jr.
RADIAL BUFFING AND DRAFT RIGGING FOR RAILWAY CARS.
APPLICATION FILED SEPT. 24, 1902.
NO MODEL. 6 SHEETS—SHEET 3.

No. 719,519. PATENTED FEB. 3, 1903.
H. H. SESSIONS, A. P. DENNIS & R. D. GALLAGHER, Jr.
RADIAL BUFFING AND DRAFT RIGGING FOR RAILWAY CARS.
APPLICATION FILED SEPT. 24, 1902.
NO MODEL. 6 SHEETS—SHEET 4.

No. 719,519. PATENTED FEB. 3, 1903.
H. H. SESSIONS, A. P. DENNIS & R. D. GALLAGHER, Jr.
RADIAL BUFFING AND DRAFT RIGGING FOR RAILWAY CARS.
APPLICATION FILED SEPT. 24, 1902.
NO MODEL. 6 SHEETS—SHEET 5.

UNITED STATES PATENT OFFICE.

HENRY H. SESSIONS, OF CHICAGO, ILLINOIS, AND ALFRED P. DENNIS AND RICHARD D. GALLAGHER, JR., OF NEW YORK, N. Y., ASSIGNORS TO STANDARD COUPLER COMPANY, OF NEW YORK, N. Y., A CORPORATION OF NEW JERSEY.

RADIAL BUFFING AND DRAFT RIGGING FOR RAILWAY-CARS.

SPECIFICATION forming part of Letters Patent No. 719,519, dated February 3, 1903.

Application filed September 24, 1902. Serial No. 124,712. (No model.)

*To all whom it may concern:*

Be it known that we, HENRY H. SESSIONS, of Chicago, county of Cook, State of Illinois, and ALFRED P. DENNIS and RICHARD D. GALLAGHER, Jr., of New York, in the county and State of New York, have invented certain new and useful Improvements in Radial Buffing and Draft Rigging for Railway-Cars; and we do hereby declare the following to be a full, clear, and exact description of the same, reference being had to the accompanying drawings, forming a part of this specification, and to the figures of reference marked thereon.

This invention relates to improvements in buffing and draft rigging of railway rolling-stock, and particularly to that type of mechanism wherein the buffing and draft strains are transmitted between cars through mechanism pivoted remote from the ends of the cars and having a wide range of angular movement with relation to the car-bodies whereby the efficiency of the apparatus is preserved during the passage of the train around curves of short radius and other well-understood advantages secured.

The objects of the invention are to provide an apparatus of the character specified wherewith the strains will be more advantageously disposed of both in respect to the car-bodies or framing thereof and the trucks and the track or way, and, further, to provide an apparatus which may be utilized to form a continuous platform between cars even on curves of relatively short radius.

Referring to the accompanying drawings, Fig. 6 is a plan, and Fig. 7 a section, showing details omitted from the foregoing figures to avoid obscurity. Fig. 8 is a section showing a modified arrangement of the means for transmitting the buffing strains to the end sill of the car-framing. Figs. 11 and 12 are sections showing modified arrangements of the means for supporting the outer portion of the rigging.

Like numerals in the several figures denote the same parts.

The portions of the underframing of the car and truck shown in the drawings are of conventional form, said frame embodying the usual body-bolster 1, an end sill 2, platform-sill 3, and longitudinal beams 4, while the truck embodies the truck-frame 5, having end sills 6, with the usual complement of springs, bearings, wheels, &c.

The truck-frame is connected with the car-frame centrally by center plates and pin 7. The end of the platform is curved, its end sill 3 being therefore arc-shaped, and the arc preferably is substantially parallel with an arc described with the pivot on which the draft and buffing gear swing as a center, as will presently appear. To brace the platform-sill, it is mounted on the ends of the longitudinal beams and further provided with an antitelescoping plate 8.

The parts thus far described while shown as of metal or what is known as "channel" and "I-beam" construction may be of any material or type of construction, the invention in the present application having relation to the draft and buffing mechanism and to the combination of such mechanism with the car-framing and truck regardless of the particular type of the latter.

Figure 1:
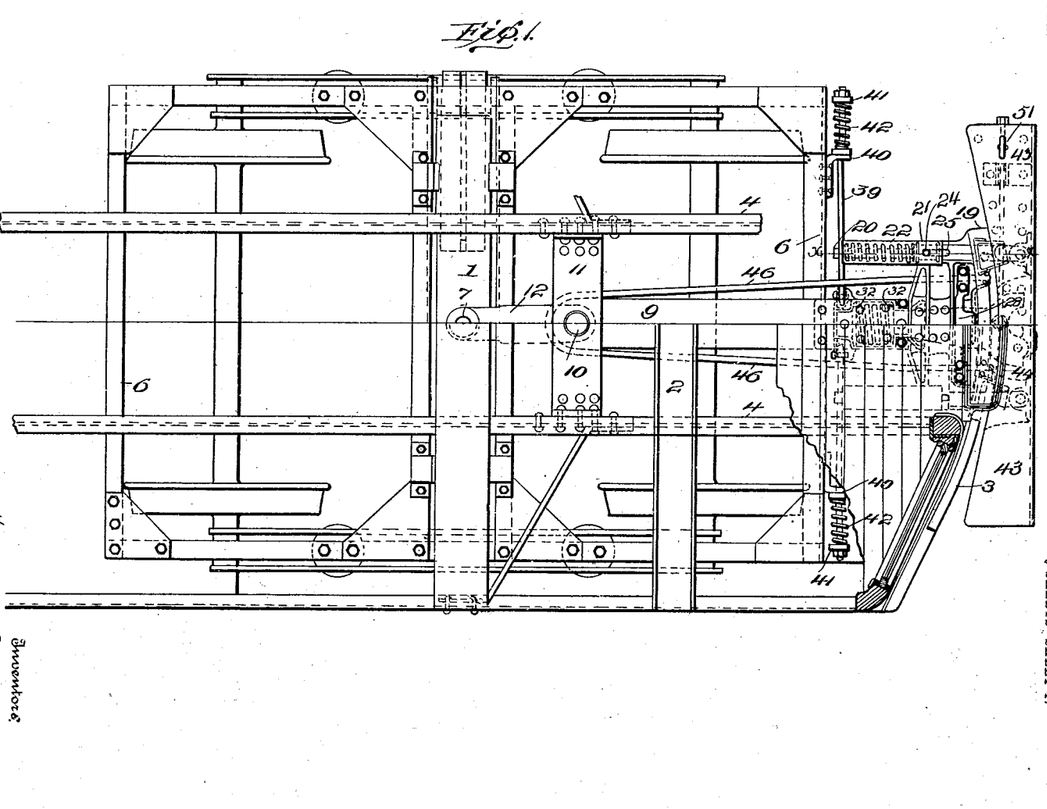
Figure 1 is a plan view of one end of a car-framing and truck with the flooring and framing partly removed.
Figures 2, 4:
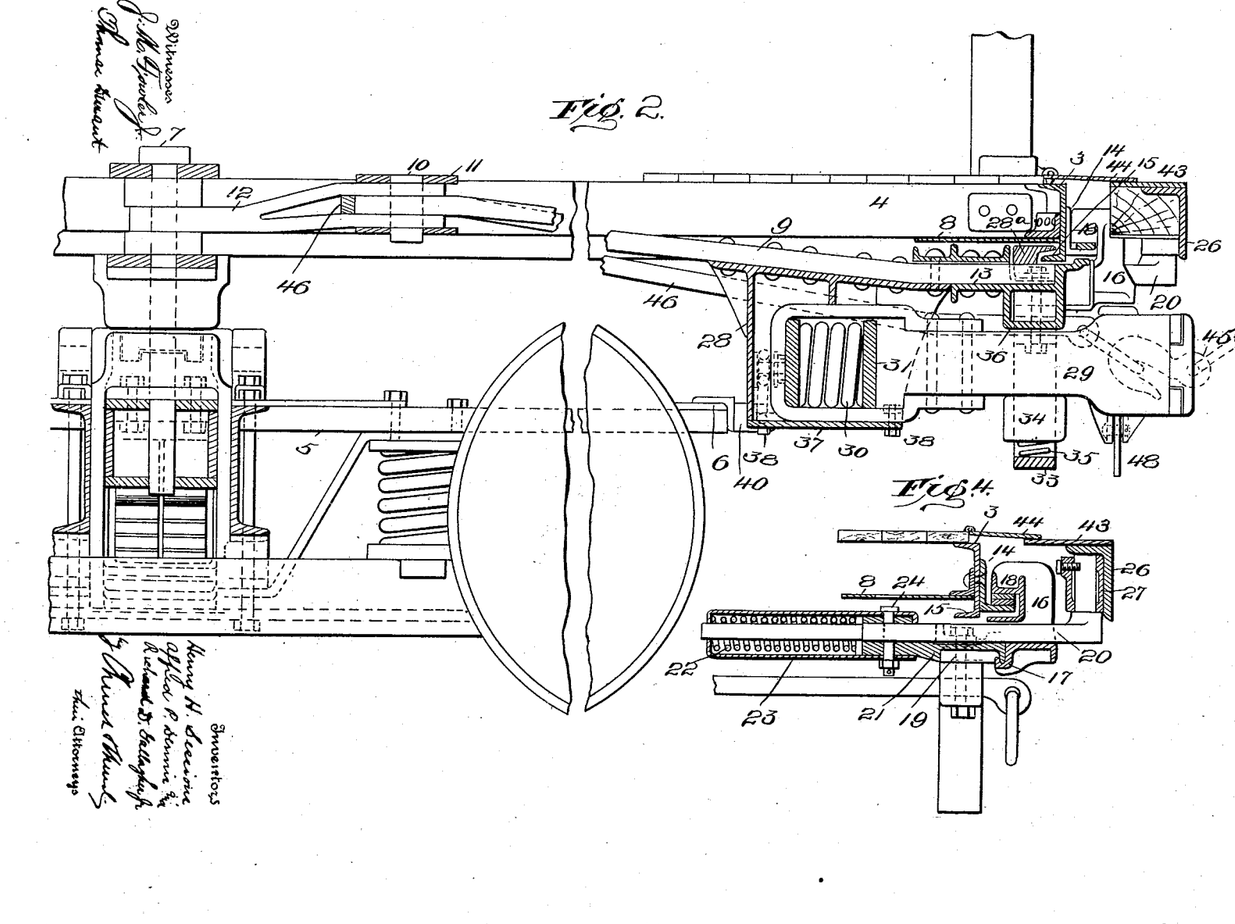
Fig. 2 is a vertical section taken on the central line with portions in elevation.
Fig. 4 is a detail section on the line *x x*, Fig. 1.
Figure 3:
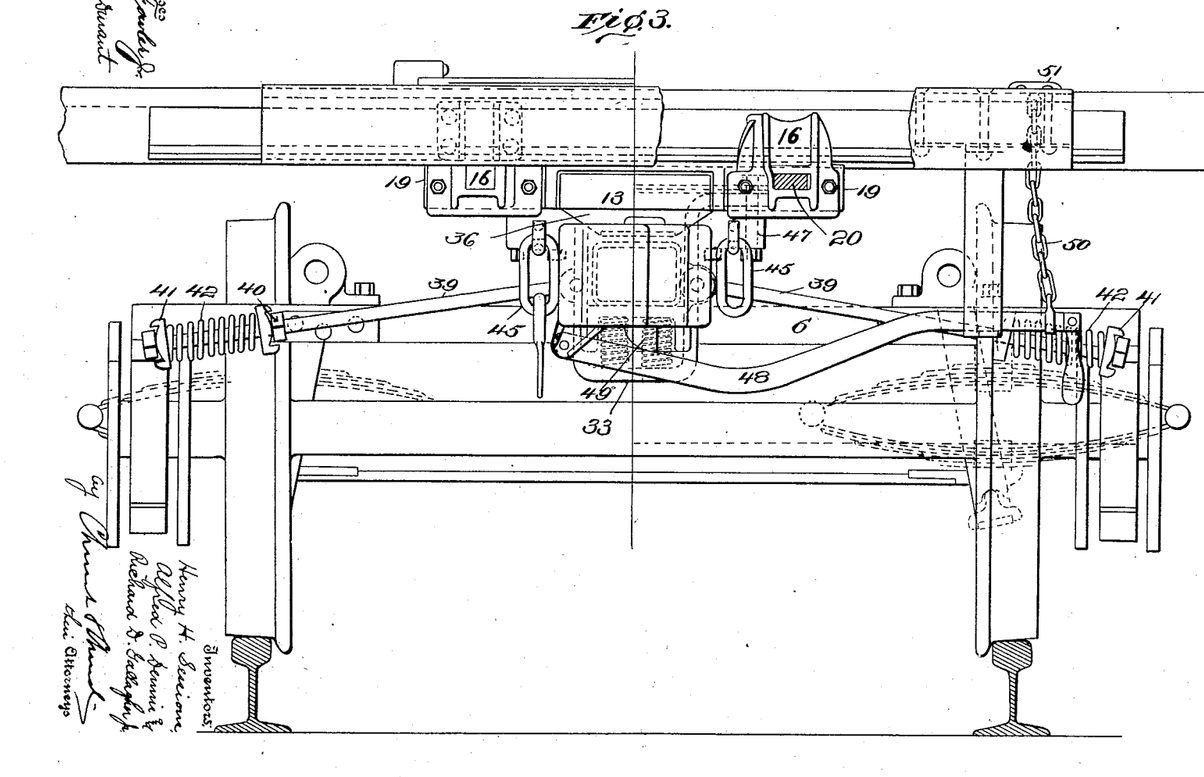
Fig. 3 is an end elevation with the buffer-beam partly removed.

The end or effective portions of the draft and buffing mechanism are carried at the forward end of what we shall herein term a "radius-bar" 9, pivoted at its rear end on a center 10, located somewhat forward of the center pin 7, but preferably connected rigidly with the car-framing, as by a cross-brace 11, and as an additional strengthening means the pin 10 of the radius-bar is connected with the center pin 7 by a link or connection 12, usually bifurcated to receive the radius-bar between its arms, as shown in Fig. 2. At its forward end the radius-bar connects with a yoke or casting 13, adapted to be supported by the car-framing, so as to be capable of transverse swinging movement and to in turn support the forward end of the radius-bar, the buffer, and the draft-gear. As the most convenient and practical means for accomplishing this end the car-frame or the platform-sill is provided with an arc-shaped trackway or guide—as, for instance, the angle-iron guide 14—although the sill itself when of channel or similar iron may form the sole and usually forms an auxiliary way or guide, for which purpose its lower flange 15 is left unobstructed throughout the range of movement of the radius-bar and connected parts. For coöperation with the way or guide 14 yoke-carriers 16 are provided, preferably simple castings having lips 17, coöperating with projections or lateral extensions 19 of the yoke 13, and shoes 18, coöperating with the way or guide, as will be readily understood from an inspection of Figs. 3 and 4. To save the necessity of separate fastenings, the yoke-carriers may be held in place on the yoke by the buffer-stems 20, which pass through bearings 21 in the yoke extensions 19 and at the rear reduced ends receive springs 22, the latter being confined in spring-casings 23, connected at their forward ends with the yoke by pins 24, the latter preferably passing through slots 25, Fig. 1, in the buffer-stems and acting as stops to limit the longitudinal movements of the stems. At their forward ends the buffer-stems support the buffer-beam or buffer proper, 26, the ends of the stems being preferably turned upwardly to fit into sockets 27 on the buffer. In this the preferred construction an additional support in the form of a safety-bar 28ª is connected with the yoke and adapted to take over the flange 15 of the sill 3, thus affording an additional guard against the yoke and connected parts becoming detached and dropping down, the arrangement being preferably such, however, that the safety-bar does not normally take a bearing on the flange, but is in position to become effective should the yoke-supports or guide fail, wear, or become detached. The draft-gear is also connected with the radius-bar for lateral movement in unison with the buffer, for which purpose the draft-gear housing 28 is hung below the radius-bar and yoke, being usually attached to the radius-bar in rear of the yoke, and the draft-gear, which may be of usual form, having a coupler-head and draw-bar 29, draft-spring 30, and follower-plates 31, works in said housing, the follower-plates being confined by shoulders 32, (dotted lines, Fig. 1,) while the forward end is supported by a carry-iron 33, bolted at its ends to the under side of the yoke. The direct support for the coupler-head is the carrier 34, which slides vertically in the carry-iron and is held up by a spring 35. Upward movement of the coupler and draw-bar may be limited by the yoke or a depending stop projection 36 on the under side of the yoke immediately over the draw-bar.

The draft-gear housing is preferably made open at the bottom to facilitate the insertion and removal of the draft-gear, and such gear is held in place and the bottom of the housing closed by a draft-gear floor-plate 37, held in place by suitable bolts 38 or similar fastenings, as shown.

The whole draft and buffing rigging is centered or maintained in proper alinement to coöperate with the gear on the other car by elastic connections between the gear and the truck-frame. These connections, as shown, are in the form of links 39, pivotally connected at their inner ends with the draft-gear housing and at their outer ends working through guides 40, secured to or forming part of the truck end sill. Confined between the guides 40 and heads 41 on the links 39 are springs 42, and it will be observed that the attachment of the links with the draft-gear is such that the said gear may swing horizontally with a center at a point between the points of attachment, which center is preferably located approximately over the center of the truck end sill, but obviously may be varied by locating the points of attachment of the links farther toward the front or rear of the draft and buffing rigging.

Figure 5:
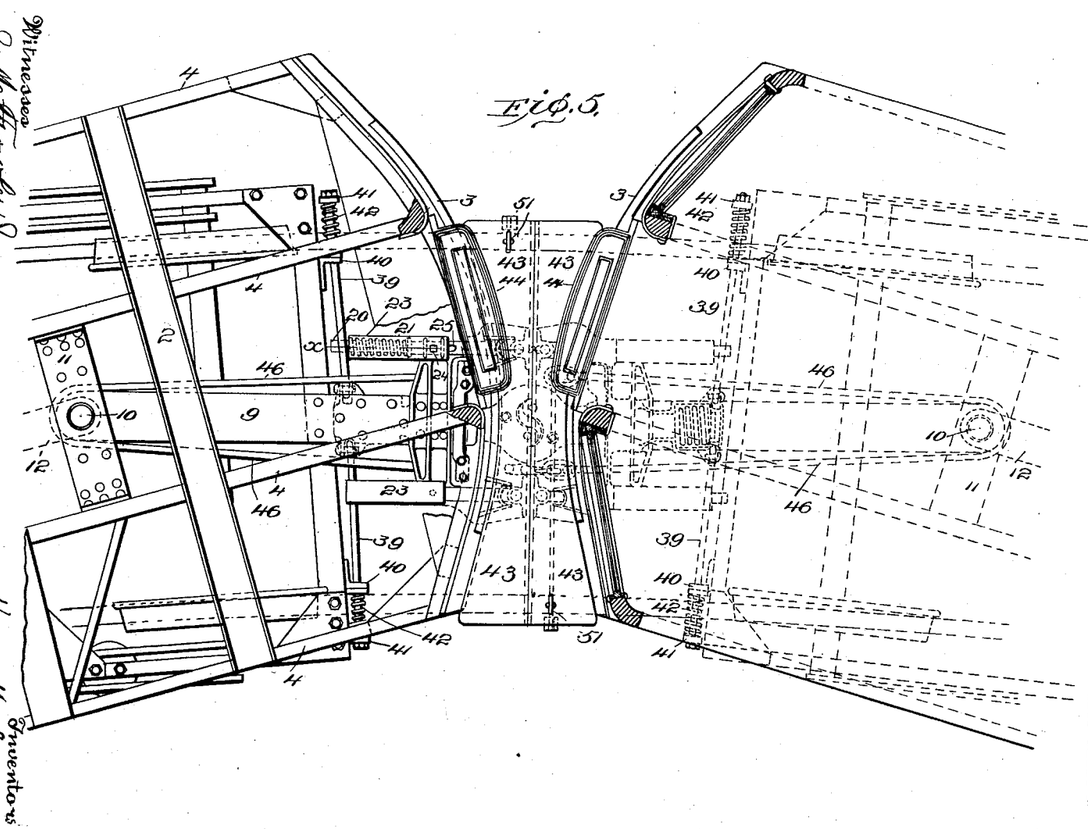
Fig. 5 is a top plan illustrating diagrammatically the action of the mechanism between adjacent ends of two cars in rounding a curve of short radius.

The effect of locating the center 10 forward of the car center-pin is in turning a curve to swing the center 10 to the outside of the central line of the truck or tangent of the track curve occupied by the truck at the particular moment, the end of the rigging, including the buffer-beam and coupler-head, moving in the opposite direction and to the inner side of said tangential line. The intermediate portion of the rigging, remaining as it does central of the end of the truck, does not develop transverse strains on the truck, as would be the case were the draft-rigging pivoted to turn on the car center-pin. The positions the parts assume on a curve are well illustrated in Fig. 5, from which figure it will also be seen that the buffers are formed straight on their outer faces, suitable top plates 43 being provided on the buffers to approximately bridge the space between the cars and, in connection with tread-plates 44 on the car-body and resting on the buffer-plates, affording a practically unbroken floor between cars regardless of the track curvature. The couplings employed are preferably such as will afford a rigid connection between the rigging on adjacent cars. Thus when coupled the two riggings remain in alinement with each other, and, in connection with the coupling, safety-chains 45 are usually employed, said chains, preferably in the form of bars 46, extending through suitable supports 47 on the yoke back and around the pins 10, whereby they are adapted to swing with the rigging.

To facilitate uncoupling, an uncoupling-lever 48 is pivoted on the draw-head in position to raise the locking-pin 49 when its outer end is raised, as by drawing up on the chain 50, extending up through an aperture in the buffer and provided at its end with a hand-piece 51.

Figures 6, 7, 8, 11, 12:
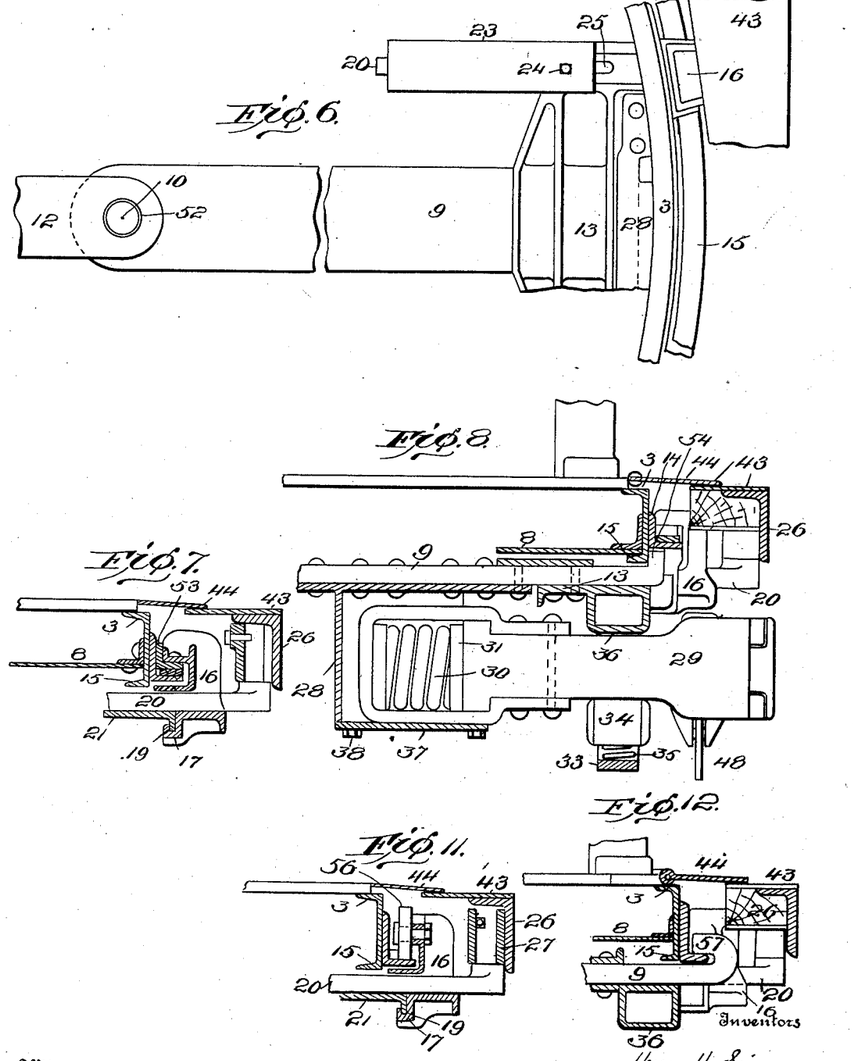

Obviously if a small amount of play were allowed or were caused by wear between the pin 10 and the radial bar the strains would, in part at least, be transmitted to the end sill. Provision for insuring this result is under some circumstances desirable and the aforesaid looseness secured by having a space about the pin 10, as at 52 in Fig. 6, and provision is made between the end sill and buffing mechanism to distribute the strains and resist wear—as, for instance, by the application of shoes or wear-plates 53 between the yoke-supports and sill (see Figs. 6 and 7)—or, as in Fig. 8, the end 54 of the radial bar may be turned upwardly to engage the front side of the said sill, the construction otherwise remaining the same as heretofore described.

Figure 9:
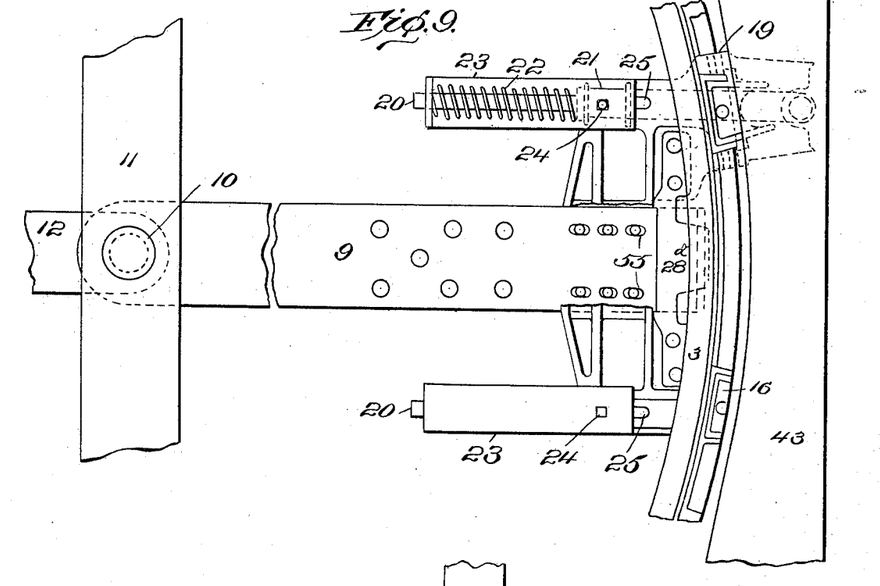
Figs. 9 and 10 are a plan and a section, respectively, showing a further modification of said mechanism whereby the buffing strains from the buffer-beam are transmitted to the end sill of the car-framing and the strains from the draw-bar are transmitted through the radial bar to the framing remote from the end of the car.
Figure 10:
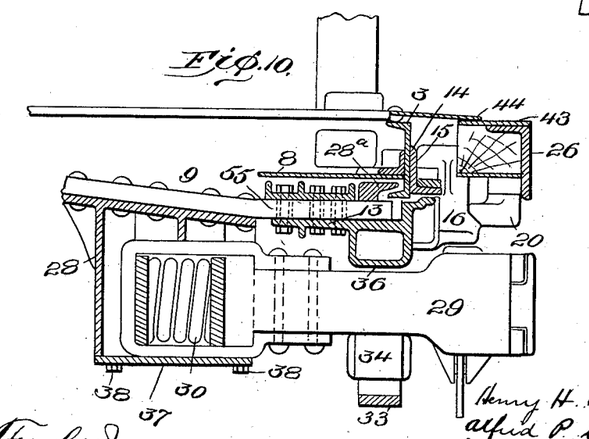

When it is desired that the strains from the buffer shall be transmitted to the sill and the coupler strains be borne by the radial bar, a slight looseness or play may be left between the yoke and the radial bar, as shown, for instance, in Figs. 9 and 10, where the bolts connecting the yoke and radial bar pass through elongated apertures 55. With this construction pressure on the buffer is transmitted through the buffer-springs to the yoke and by the latter to the sill, while strains from the draw-bar in both directions are transmitted through the radial bar.

Modifications in the means for connecting the parts are obvious from the foregoing. For instance, antifriction-wheels may be interposed between the yoke and its way or guide, one such arrangement being shown in Fig. 11, wherein the antifriction-wheel 56 is journaled on the yoke-carrier and travels on the guide, or in lieu of the provision of special yoke-carriers the end of the radial bar may be bent back to engage the guide, as at 57 in Fig. 12, and afford the supporting means for the draft and buffing rigging, as well as a means for transmitting a portion of the buffing strains to the sill.

Having thus described our invention, what we claim as new, and desire to secure by Letters Patent, is—

1. The combination with a car and its truck pivotally connected together, of a draft and buffing rigging pivotally connected with the car on a center forward of the truck-pivot to swing radially and an elastic centering connection between the truck and draft and buffing rigging located intermediate the pivot and outer end of said rigging whereby in turning a curve the opposite ends of the rigging are turned to opposite sides of the tangent occupied by the truck.

2. The combination with a car and its truck pivotally connected together, of a draft and buffing rigging pivotally connected with the car on a center forward of the truck-pivot to swing radially, a guide on the end of the car on which said rigging is supported and a centering connection between the truck and rigging located intermediate the guide and rigging-pivot; substantially as described.

3. The combination with a car and its truck pivotally connected together, of a draft and buffing rigging pivotally connected with the car on a center forward of the truck-pivot to swing radially, a guide on the end of the car on which said rigging is supported and an elastic centering connection between the truck and rigging located intermediate the guide and rigging-pivot; substantially as described.

4. The combination with a car-frame having a guide at its end and a truck pivotally connected with said frame, of a radial bar pivotally connected with the car-frame on a center forward of the truck-pivot and supported at its forward end by the guide, a centering connection between the car and truck located intermediate the pivot and guide for the bar, and a buffer and draw-bar and head mounted on the radial bar; substantially as described.

5. The combination with a car, a radially-movable bar pivotally connected therewith and an arc-shaped guide interposed between the forward end of the bar and car-frame, of a buffer mounted on said bar and movable toward and from the axis of the bar, a coupler suspended from the bar below the buffer and a spring-supported coupler-carrier hung from the bar; substantially as described.

6. The combination with a car, a radially-movable bar pivotally connected therewith and an arc-shaped guide interposed between the forward end of the bar and car-frame, of a buffer movably mounted on the end of the bar and springs for holding said buffer advanced independently of the bar; substantially as described.

7. The combination with a car, having an arc-shaped guide at the end and a radially-movable bar pivotally connected with the car at the center on which the arc is formed, of a yoke mounted on the bar and coöperating with the guide, a buffer, buffer-stems mounted to slide in said yoke and springs interposed between the stems and yoke to hold the buffer advanced independently of the yoke; substantially as described.

8. The combination with a car having an arc-shaped guide at the end, and a radially-movable bar pivotally connected with the car at the center on which the arc is formed, of a yoke mounted on the bar and coöperating with the guide, a buffer carried by the yoke, a draft-gear housing connected with the bar independently of the yoke and a draft-gear mounted in said housing; substantially as described.

9. The combination with a car having an arc-shaped guide at the end and a radially-movable bar pivotally connected with the car at the center on which the arc is formed, of a yoke mounted on the bar and coöperating with the guide, a buffer carried by the yoke, a draft-gear housing connected with the bar independently of the yoke, a draft-gear mounted in said housing and a carry-iron for the draft-gear supported by the yoke; substantially as described.

10. The combination with a car having an arc-shaped guide at the end and a radially-movable bar pivotally connected with the car at the center on which the arc is formed, of a yoke and a draft-gear housing mounted on the bar, said yoke coöperating with the guide, a buffer supported by the yoke above and a draft-gear supported by the housing below the level of the end of the radial bar; substantially as described.

11. In a draft and buffing rigging, the combination with the radial bar adapted to be pivotally supported at its rear end, of a yoke carried by the forward end of said bar and having lateral extensions, buffer-stems mounted to slide in said extensions, a buffer on the outer ends of said stems, springs for holding the stems and buffer advanced independently of the yoke, and means for supporting the yoke while permitting it to move radially with the bar; substantially as described.

12. In a draft and buffing rigging, the combination with the radial bar, the yoke mounted thereon and having the lateral extensions, and the upwardly-extending yoke-carriers, of the buffer-stems mounted to slide in the yoke, the buffer on said stems and the springs coöperating with said stems and yoke for holding the buffer advanced independently of the yoke; substantially as described.

13. In a draft and buffing rigging, the combination with the radial bar, the yoke having the upwardly-extending yoke-supports, downwardly-extending carry-iron and buffer mounted on the yoke, of the draft-gear housing carried below the bar, and the draft-gear mounted in said housing and projecting through the carry-iron; substantially as described.

14. In a draft and buffing rigging, the combination with the yoke having the upwardly-extending carriers adapted to coöperate with an arc-shaped guide, the downwardly-extending carry-iron and the limiting-stop within the carry-iron, of the radially-movable bar on which the yoke is mounted and the draft-rigging also carried by said bar and having its draw-bar projected through the carry-iron below the limiting-stop; substantially as described.

15. In a draft and buffing rigging the combination with the car, the radial bar pivoted thereto, the yoke on said bar and the arc-shaped guide around which the yoke travels in its radial movements, of the buffer, the coupler and the safety-chains all made fast on the inner side of the yoke and projecting through to the outer side of the same, whereby all of said parts are connected for unitary radial movements substantially as described.

16. In a draft-rigging the combination with the car, radial bar pivotally mounted on the car and draft-gear carried by the radial bar, of a safety-chain movable radially with the draft-gear and passing around the pivot on which the radial bar turns; substantially as described.

17. In a rigging such as described, the combination with the car and truck pivotally connected and sill on the car having the horizontal guide-flange, of the radial bar pivotally connected with the car forward of the pivotal connection with the truck and supported by the guide-flange at the forward end, the buffer and draft-gear carried by the radial bar, and links pivotally connected with the radial bar at their inner ends and with the truck-frame at their outer ends; substantially as described.

18. In a rigging such as described, the combination with the car, truck to which it is pivotally connected and the radial bar pivotally connected with the car on a center forward of the truck-pivot and supported by the car at the outer end to move radially with relation thereto, of draft-rigging carried by the radial bar and elastic pivotal connections between the radial bar and forward end of the truck-frame whereby the radial bar is centered and permitted a longitudinal movement in swinging into or out of line with the car; substantially as described.

19. In a rigging such as described, the combination with the car, truck to which it is pivotally connected and the radial bar pivotally connected with the car forward of the truck-pivot and supported by the car at the outer end to move radially with relation thereto, of draft-rigging carried by the radial bar, links pivotally connected at their inner ends with the radial bar, projections on the truck through which the outer ends of the links pass and springs confined between enlargements on the links and said projections; substantially as described.

20. In a rigging such as described, the combination with the car-frame and truck pivotally connected therewith by a center-pin, of a draft-rigging pivotally connected with the car-frame on a center forward of the truck-pivot, means connected with the truck for centering said rigging and a connection between the pivot of the draft-rigging and center-pin; substantially as described.

21. In a rigging such as described, the combination with the car-frame having a channel-iron sill formed on an arc, of a draft and buffing rigging pivotally connected with the car at the center on which the arc is formed, a projection carried by the said rigging and overlying the bottom flange of the channel-iron sill whereby the rigging is prevented from dropping and centering mechanism connected with the truck; substantially as described.

22. In a rigging such as described, the combination with the car-frame having an end sill formed with arc-shaped guiding means, and a draft and buffing rigging pivotally connected with the car at the center on which the arc is formed, of two projections coöperating with said arc-shaped guiding means, one on each side of the center line of the rigging and a third projection engaging with said guiding means located on said center line; substantially as described.

23. In a rigging such as described the combination with the car-frame having an end sill formed with oppositely-projecting arc-shaped flanges and a draft and buffing rigging pivotally connected with the car at the center on which the arc is formed, of projections on the draft and buffing rigging projecting in opposite directions to engage both the said flanges; substantially as described.

24. In a draft-rigging such as described the combination with the car having an arc-shaped guide, a radial bar pivotally connected with the car at the center on which the arc is formed, and antifriction-rollers connected with the bar and coöperating with the guide, a buffer supported by the bar but movable toward and from the axis of the same and a draft-gear also supported by the bar; substantially as described.

25. In a draft-gear such as described, the combination with the car having an arc-shaped sill and arc-shaped guide supported thereby, a radial bar pivotally connected with the car at the center on which the arc is formed and antifriction-rollers connected with the bar and coöperating with the guide, of a buffer carried by the bar and movable toward and from the axis of the same, springs for holding the buffer advanced, and a draft-gear hung below the bar and projecting below the plane of the guide; substantially as described.

26. In a rigging such as described, the combination with the car-frame having an end sill formed with oppositely-projecting arc-shaped flanges, a radial bar pivotally connected with the car at the center on which the arc is formed, a yoke carried by said bar, a draft-gear carried by the bar, a buffer carried by the yoke and projections on the yoke projecting in opposite directions to engage both the said flanges; substantially as described.

HENRY H. SESSIONS.
ALFRED P. DENNIS.
RICHARD D. GALLAGHER, JR.

Witnesses:
ALEXANDER H. COOKE,
ALEXANDER W. TAYLOR.